United States Patent
Shoji

(10) Patent No.: US 11,324,062 B2
(45) Date of Patent: May 3, 2022

(54) NETWORK APPARATUS, BASE STATION APPARATUS, AND COMMUNICATION CONTROL METHOD

(71) Applicant: NEC Corporation, Tokyo (JP)

(72) Inventor: Takuya Shoji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/043,268

(22) PCT Filed: Apr. 25, 2019

(86) PCT No.: PCT/JP2019/017543
§ 371 (c)(1),
(2) Date: Sep. 29, 2020

(87) PCT Pub. No.: WO2019/208673
PCT Pub. Date: Oct. 31, 2019

(65) Prior Publication Data
US 2021/0045179 A1  Feb. 11, 2021

(30) Foreign Application Priority Data

Apr. 26, 2018  (JP) .............................. JP2018-084771

(51) Int. Cl.
*H04W 76/18* (2018.01)
*H04W 88/08* (2009.01)

(52) U.S. Cl.
CPC ............ *H04W 76/18* (2018.02); *H04W 88/08* (2013.01)

(58) Field of Classification Search
CPC ..... H04W 76/18; H04W 88/08; H04W 48/18; H04W 4/70; H04W 48/02; Y02D 30/70
See application file for complete search history.

(56) References Cited

U.S. PATENT DOCUMENTS

| 2011/0199905 A1 | 8/2011 | Pinheiro et al. |
| 2012/0155257 A1 | 6/2012 | Tiwari |

(Continued)

FOREIGN PATENT DOCUMENTS

| JP | 2013-038759 A | 2/2013 |
| JP | 2013-085213 A | 5/2013 |

(Continued)

OTHER PUBLICATIONS

International Search Report for PCT Application No. PCT/JP2019/017543, dated Jul. 2, 2019.

(Continued)

*Primary Examiner* — Diane D Mizrahi
(74) *Attorney, Agent, or Firm* — Sughrue Mion, PLLC

(57) ABSTRACT

A network apparatus includes: a network selection part which selects, between a first network and a second network that accommodates a terminal(s) that belongs to a predetermined terminal type, a network to which a terminal is to be connected, based on the terminal type; and a connection request processing part which transmits, when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned.

13 Claims, 16 Drawing Sheets

(56) References Cited

U.S. PATENT DOCUMENTS

| | | | |
|---|---|---|---|
| 2013/0016607 A1 | 1/2013 | Tiwari | |
| 2013/0201823 A1 | 8/2013 | Gupta | |
| 2014/0119192 A1 | 5/2014 | Koshimizu et al. | |
| 2016/0381639 A1 | 12/2016 | Kim et al. | |
| 2019/0028887 A1 | 1/2019 | Ryu et al. | |
| 2019/0364492 A1* | 11/2019 | Azizi | H04W 48/16 |

FOREIGN PATENT DOCUMENTS

| | | |
|---|---|---|
| JP | 2014-078987 A | 5/2014 |
| JP | 2015-084558 A | 4/2015 |
| JP | 2016-226014 A | 12/2016 |
| JP | 2017-507527 A | 3/2017 |
| WO | 2017/079074 A1 | 5/2017 |
| WO | 2017/081864 A1 | 5/2017 |
| WO | 2017/126884 A1 | 7/2017 |

OTHER PUBLICATIONS

3GPP TS 23.401 v15.3.0 "General Packet Radio Service (GPRS) enhancements for Evolved Universal Terrestrial Radio Access Network (E-UTRAN) access (Release 15)", [online], [searched on Apr. 5, 2018], Internet<URL:http://www.3gpp.org/ftp//Specs/archive/23_series/23.401/>, France.

* cited by examiner

FIG. 10

| FAILURE DURATION TIME | BACK-OFF TIMER VALUE |
|---|---|
| LESS THAN 00:10:00 | 3 MINUTES |
| 00:10:01~00:20:00 | 5 MINUTES |
| 00:20:01~ | 10 MINUTES |

NETWORK APPARATUS, BASE STATION APPARATUS, AND COMMUNICATION CONTROL METHOD

REFERENCE TO RELATED APPLICATION

This application is a National Stage Entry of PCT/JP2019/017543 filed on Apr. 25, 2019, which claims priority from Japanese Patent Application 2018-084771 filed on Apr. 26, 2018, the contents of all of which are incorporated herein by reference, in their entirety.

The present invention relates to a network apparatus, a base station apparatus, and a communication control method.

FIELD

BACKGROUND

PTL (Patent Literature) 1 discloses a method for supporting a power saving mode (PSM) of a wireless device. According to PTL 1, when a PSM is needed, an MTC device transmits a request message including a first active time value to a network entity such as an MME or an SGSN, or the like. The MTC device then receives a rejection message to the request message from the network entity. It is said that this rejection message then includes a cause for rejection and a second active time value that is determined in view of the first active time value. After receiving the rejection message, the MTC device then terminates the procedure of transmitting the request message and enter a PSM state based on the second active time value. The term MTC in this "MTC device" stands for "Machine Type Communication", and the MTC device is nearly synonymous with an M2M communication device and an IoT (Internet of things) device. In addition, the terms "MME" and "SGSN" stand for "Mobility Management Entity" and "Serving GPRS (General Packet Radio Service) Supporting Node", respectively.

PTL2 discloses a configuration in which, when a network is determined to be congested, a network controller provides UE (User Equipment) with a wait time value along with a connection rejection message in the same way. The term "UE" stands for "User Entity".

In addition, PTLs 3 and 4 also disclose a configuration for notifying of a connection rejection message with an extended wait timer or a back-off timer as a part of congestion control.

In addition, NPL (Non Patent Literature) 1 describes provision of a dedicated core network (DCN) as a dedicated network that accommodates the above MTC devices and IoT devices. NPL 1 also describes that an MME that has received a connection request of a terminal from an eNB (e-Node B) determines an MMEGI (MME Group Identifier) based on a terminal type and replies a Reroute request to the eNB (e-Node B). In addition, NPL 1 describes a procedure for the eNB to forward a connection request from a terminal to an MME corresponding to a DCN based on MMEGI (see 5.19 Procedures to support Dedicated Core Networks).

PTL 1: Japanese Patent Kohyo Publication No. JP2017-507527A

PTL2: Japanese Patent Kokai Publication No. JP2016-226014A

PTL3: Japanese Patent Kokai Publication No. JP2014-78987A

PTL4: Japanese Patent Kokai Publication No. JP2013-85213A

NPL 1: 3GPP TS 23.401 v15.3.0 "General Packet Radio Service (GPRS) enhancements for Evolved Universal Terrestrial Radio Access Network (E-UTRAN) access (Release 15)", [online], [searched on Apr. 5, 2018], Internet<URL: http://www.3gpp.org/ftp//Specs/archive/23_series/23.401/>

SUMMARY

The following analysis has been given by the present invention. In a configuration arranged in a DCN described in NPL 1, it is considered that a failure may occur in the DCN. As countermeasures against this case, it is considered that an eNB or the like narrows down access control target devices and terminals to terminals that are to be accommodated in the DCN by using a terminal type or the like, and puts restrictions. However, if the devices and terminals that are to be accommodated in the DCN include high-spec terminals such as M2M terminals of LTE (Long Term Evolution) category 4, smartphones also classified into LTE category 4 result in targets of access control. Thus, there is a problem in that smartphones cannot be connected to a general core network. The term "M2M" stands for "machine to machine".

In addition, if access control is performed on the DCN, the control target devices and terminals (hereinafter collectively referred to as "terminals") repeatedly transmit connection requests, and thus, there is another problem in that these terminals unnecessarily consume power.

It is an object of the present invention to provide a network apparatus, a base station apparatus, and a communication control method that can contribute to optimization of targets of access control in case of a failure or the like in a DCN as described above and reduction of their power consumption.

According to a first aspect, there is provided a network apparatus, including: a network selection part which selects, between a first network and a second network that accommodates a terminal(s) that belongs to a predetermined terminal type, a network to which a terminal is to be connected, based on the terminal type; and a connection request processing part which transmits, when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned.

According to a second aspect, there is provided a base station apparatus, wherein the base station apparatus is connected to a network apparatus including a network selection part which selects, between a first network and a second network that accommodates a terminal(s) that belongs to a predetermined terminal type, a network to which a terminal is to be connected, based on the terminal type, and wherein the base station apparatus includes: an abnormality detection part which detects that the second network is in a state where the second network cannot accommodate the terminal(s) that belongs to the predetermined terminal type; and a connection request processing part which transmits, when the second network is selected by the network apparatus and when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned.

According to a third aspect, there is provided a communication control method, including steps of: selecting, between a first network and a second network that accommodates a terminal(s) that belongs to a predetermined terminal type, a network to which a terminal is to be connected, based on the terminal type; and transmitting, when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned. This method is associated with a certain machine referred to as a network apparatus including a connection request processing part that processes connection requests from terminals.

According to a third aspect, there is provided a communication control method, including: selecting, between a first network and a second network that accommodates a terminal(s) that belongs to a predetermined terminal type, a network to which a terminal is to be connected, based on the terminal type; and transmitting, when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned. This method is associated with a certain machine referred to as a network apparatus including a connection request processing part that processes connection requests from terminals.

According to a fourth aspect, there is provided a communication control method, including: by a base station apparatus connected to a network apparatus which includes a network selection part that selects, between a first network and a second network that accommodates a terminal(s) that belongs to a predetermined terminal type, a network to which a terminal is to be connected, based on the terminal type, receiving a result of selection of the network to which the terminal is to be connected from the network apparatus; and transmitting, when the second network is selected by the network apparatus and when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned. This method is associated with a certain machine referred to as a base station apparatus including a connection request processing part that processes connection requests from terminals.

According to a fifth aspect, there is provided a program for realizing the functions of the above network apparatus or base station apparatus. This program may be recorded in a computer-readable (non-transitory) storage medium. Namely, the present invention can be implemented as a computer program product. In addition, this program can be inputted to a computer apparatus via an input apparatus or a communication interface from the outside, be stored in a storage device, and drive a processor in accordance with predetermined steps or processing. In addition, this program can display its processing result including an intermediate state as needed via a display device per stage or communicate with the outside via a communication interface. The computer apparatus for this purpose includes, for example, a processor, a storage device, an input device, a communication interface, and a display device as needed which can typically be connected to each other via a bus.

Advantageous Effects of Invention

According to the present invention, it is possible to contribute to optimization of targets of access control in case of a failure or the like in a DCN as described above and reduction of their power consumption. Namely, the present invention converts the network apparatus and the base station apparatus described in Background respectively into those that can operate appropriately in case of a failure in a DCN.

BRIEF DESCRIPTION OF DRAWINGS

FIG. 10 illustrates an example of a back-off timer value setting method according to the first exemplary embodiment of the present invention.

PREFERRED MODES

Figure 1:
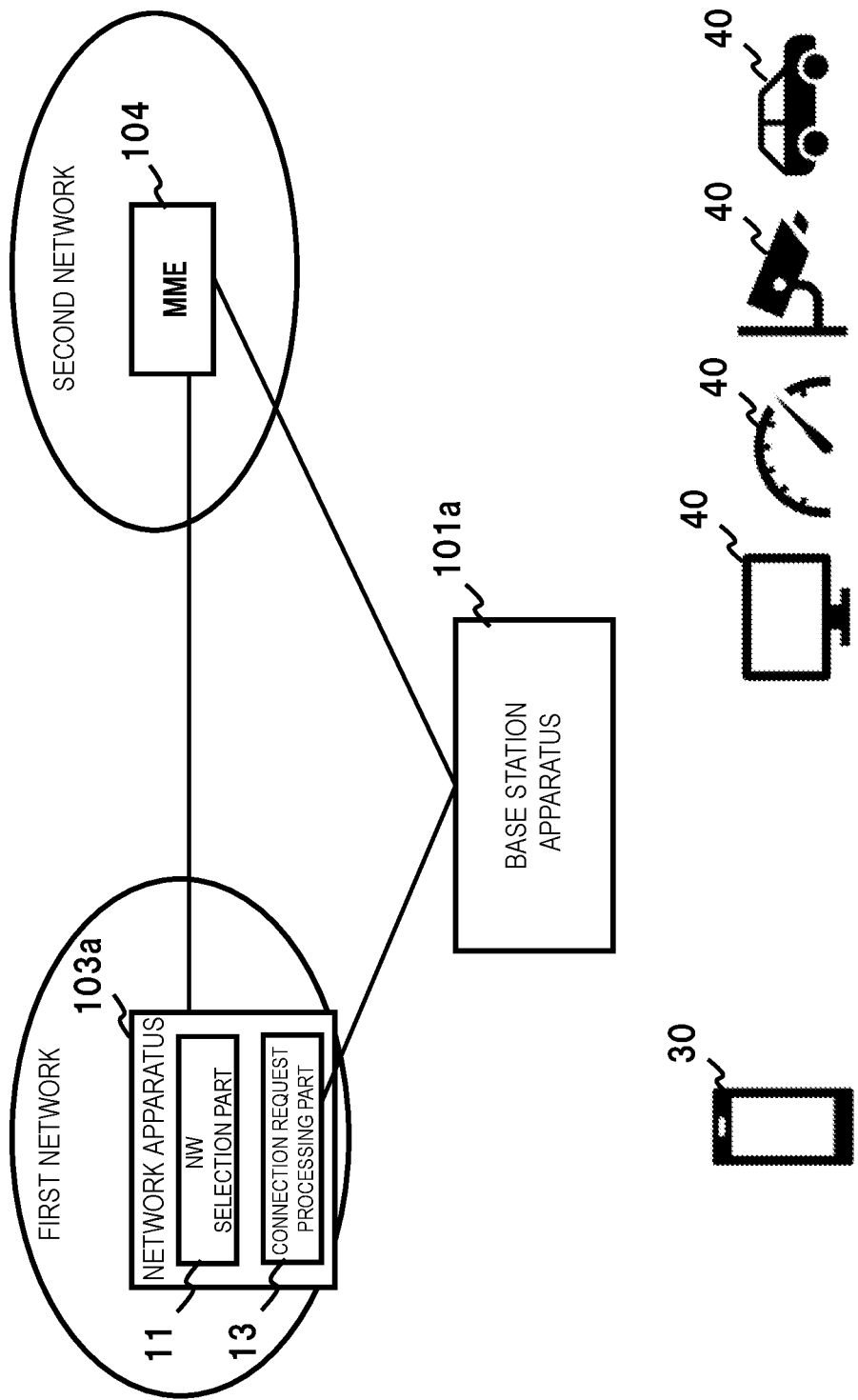
FIG. 1 illustrates a configuration according to an exemplary embodiment of the present invention.

First, an outline of an exemplary embodiment of the present invention will be described with reference to drawings. In the following outline, reference signs of the drawings are denoted to each element as an example for the sake of convenience to facilitate understanding and is not intended to limit the present invention to the illustrated modes. An individual connection line between blocks in an individual drawing, etc. referred to hereinafter includes both one-way and two-way directions. A one-way arrow schematically illustrates a principal signal (data) flow and does not exclude bidirectionality. While not illustrated, a port(s) or an interface(s) exists at an input-output connection point(s) in an individual block in the drawings. In addition, a program is executed via a computer apparatus, and the computer apparatus includes, for example, a processor, a storage device, an input device, a communication interface, and a display device as needed. In addition, the computer apparatus is configured to be capable of communicating with its internal device or an external apparatus (including a computer) via the communication interface through wired or wireless connection.

In an exemplary embodiment, the present invention is realized by a network apparatus 103*a* that receives connection requests from various terminals 30 and 40 via a base station apparatus 101*a* as illustrated in FIG. 1.

More concretely, the network apparatus 103 a includes a network selection part (hereinafter, "NW selection part") 11 and a connection request processing part 13. The NW selection part 11 selects, between a first network and a second network that accommodates terminals that belong to a predetermined terminal type, a network to which a terminal that has transmitted a connection request is to be connected, based on the terminal type.

When the second network is in a state where the second network cannot accommodate the terminals that belong to the predetermined terminal type, the connection request processing part 13 transmits a connection rejection request in which a back-off timer value is set, to a network connection request from a terminal concerned.

Figure 2:
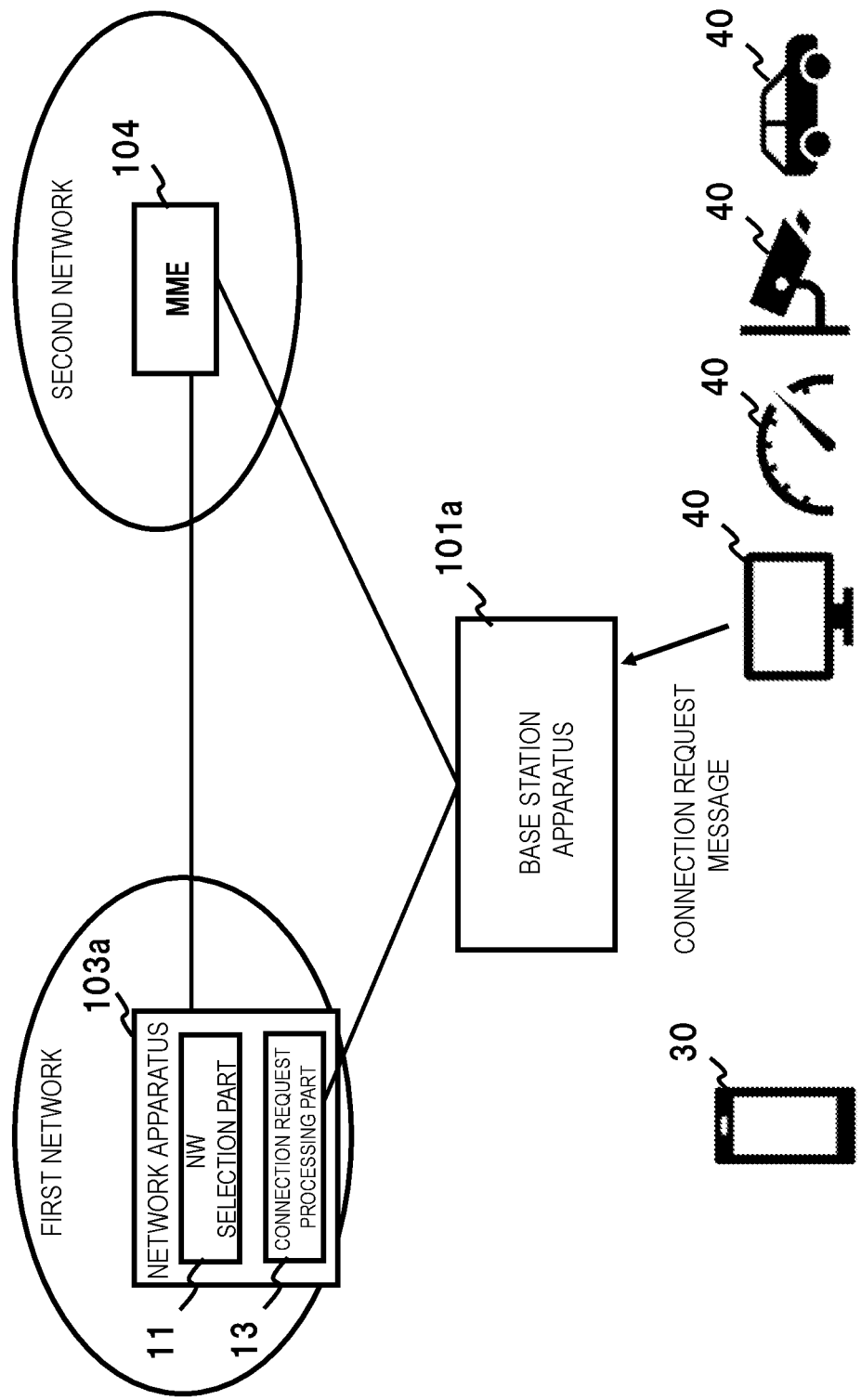
FIG. 2 illustrates an operation accordig to the exemplary embodiment of the present invention.

For example, as illustrated in FIG. 2, when a terminal 40 transmits a connection request to the base station apparatus 101*a*, the base station apparatus 101*a* forwards the connection request to the network apparatus 103*a*.

The network apparatus 103*a* that received the connection request selects a network to which the terminal that has transmitted the connection request is to be connected, based on a terminal type. For example, the network apparatus 103*a* acquires an MME group ID (MMEGI) by using a UE Usage type or the like acquired from an IPSCP (IP Service Control Point) or the like as a key. Next, as a result of inquiry, if the acquired MMEGI indicates an MME managing the second network, the network apparatus 103*a* transmits a reroute request including the MMEGI to the base station apparatus 101*a*. This reroute request corresponds to transmission of a result of selection of the network to which the terminal is to be connected from the network apparatus 103*a* to the base station apparatus 101*a*. The base station apparatus 101*a* transmits a connection request to the MME 104 managing the second network. Up to here, things are the same as those of the DCN selection function (DECOR function) defined in NPL 1 (however, the network apparatus corresponds to an MME).

Figure 3:
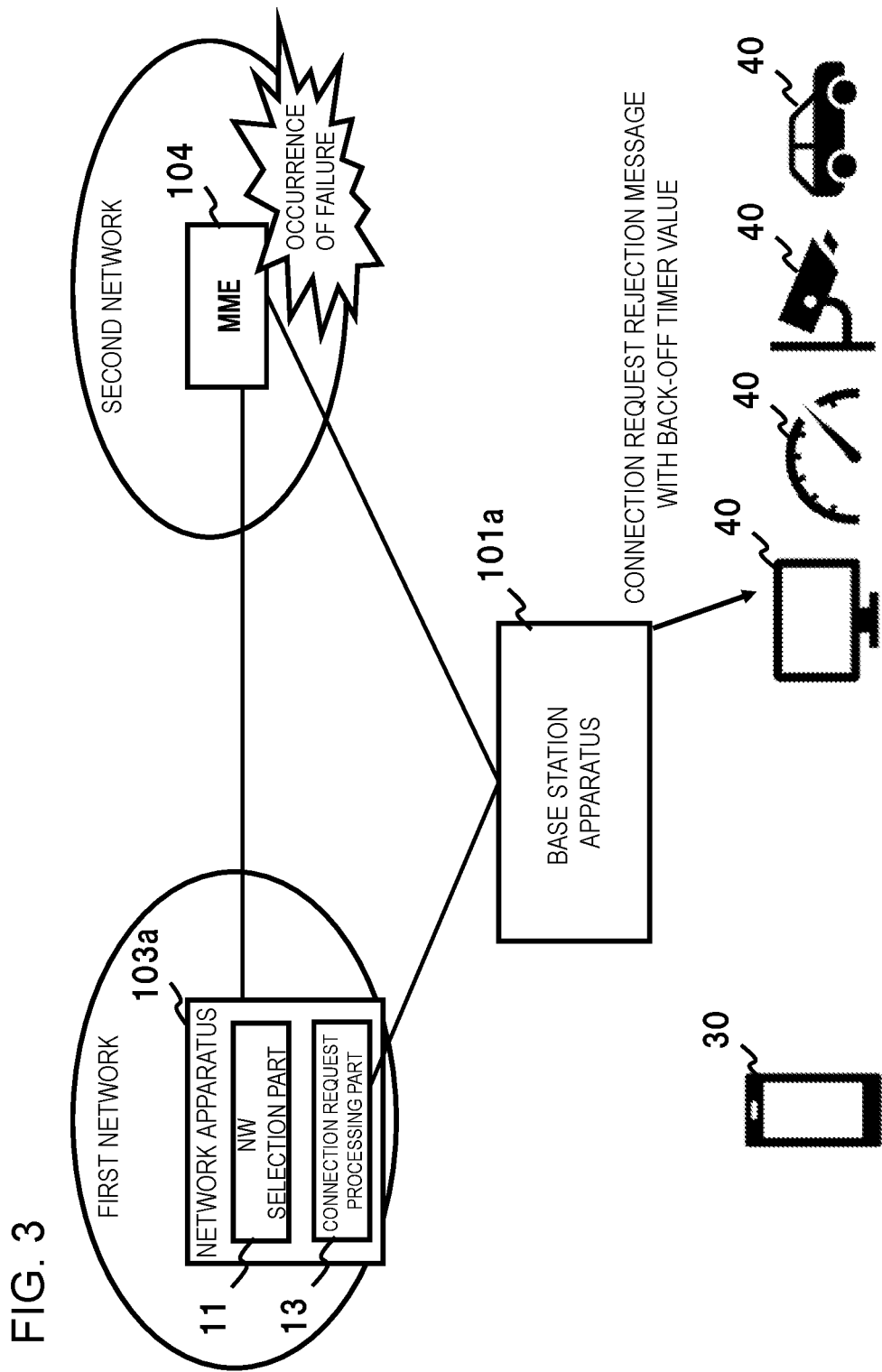
FIG. 3 illustrates an operation accordig to the exemplary embodiment of the present invention.

In the present exemplary embodiment, in the above process, if it is determined that a failure or the like has occurred in the second network, the connection request processing part 13 of the network apparatus 103*a* transmits a connection request rejection message in which a back-off timer value is set, to the terminal 40 (see FIG. 3). The back-off timer value is a value that indicates a time period (an interval, an inhibiting period) during which transmission of the next network connection request is inhibited.

The terminal 40 that received the connection request rejection message in which the back-off timer value is set stops transmission of a connection request again until the time indicated by the back-off timer value elapses.

In contrast, for example, when the terminal 30 such as a smartphone illustrated in FIG. 3 transmits a connection request, regardless of presence or absence of a failure in the second network, the first network is selected by the above DCN selection function (DECOR function), and the terminal 30 is excluded from the access control targets. In this way, optimization of the targets of access controlling in case of a failure or the like in the second network and reduction of their power consumption are achieved.

Figure 4:
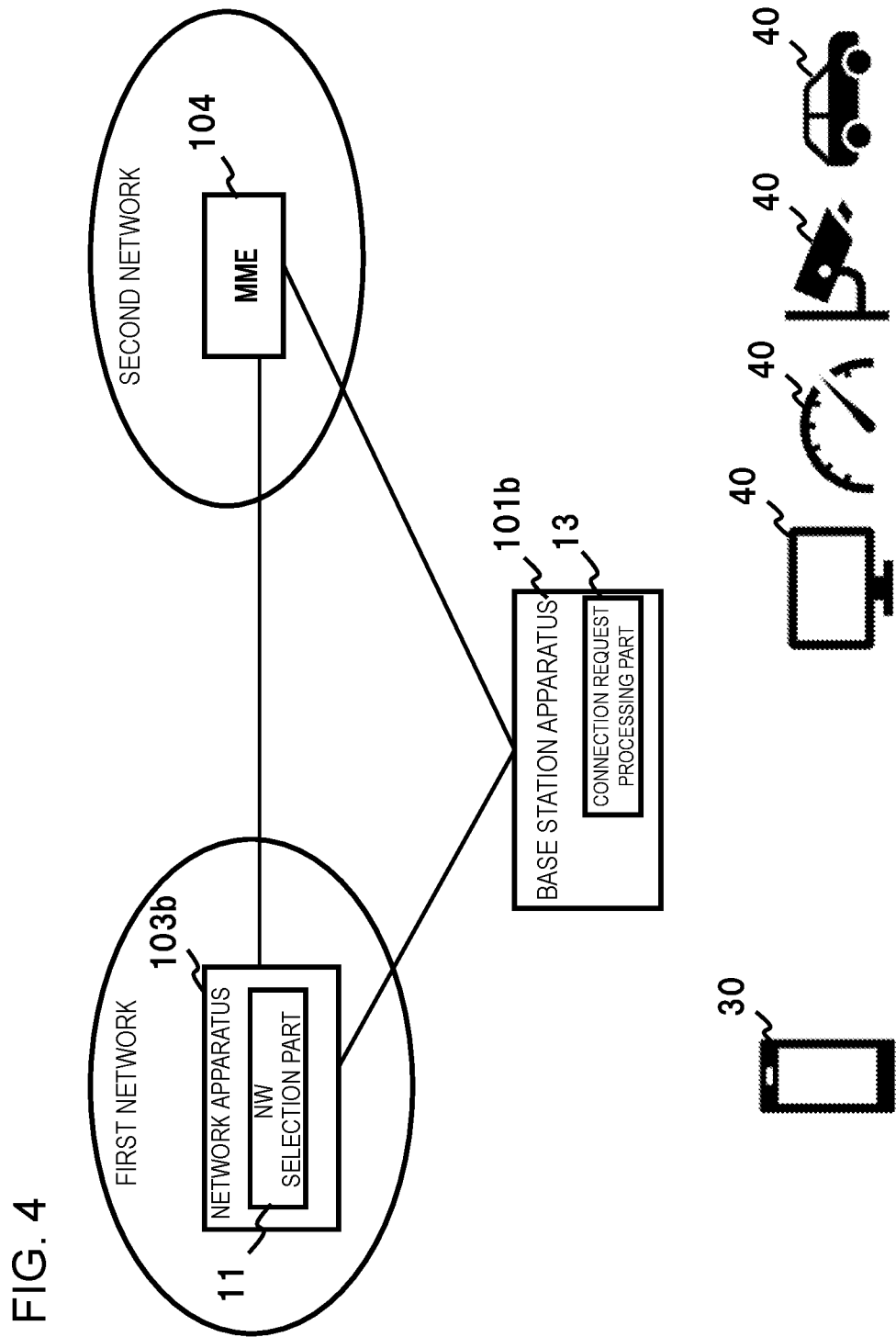
FIG. 4 illustrates a configuration according to another exemplary embodiment of the present invention.

In the above example, it is explained for an example where the connection request processing part 13 is arranged in the network apparatus 103*a* side, but the connection request processing part 13 may be arranged in the base station apparatus 101*b* side as illustrated in FIG. 4. In this case, the network apparatus 103*b* becomes to perform the same operations as those performed by an MME having the DCN selection function (DECOR function) defined in NPL 1.

First Exemplary Embodiment

Figure 5:
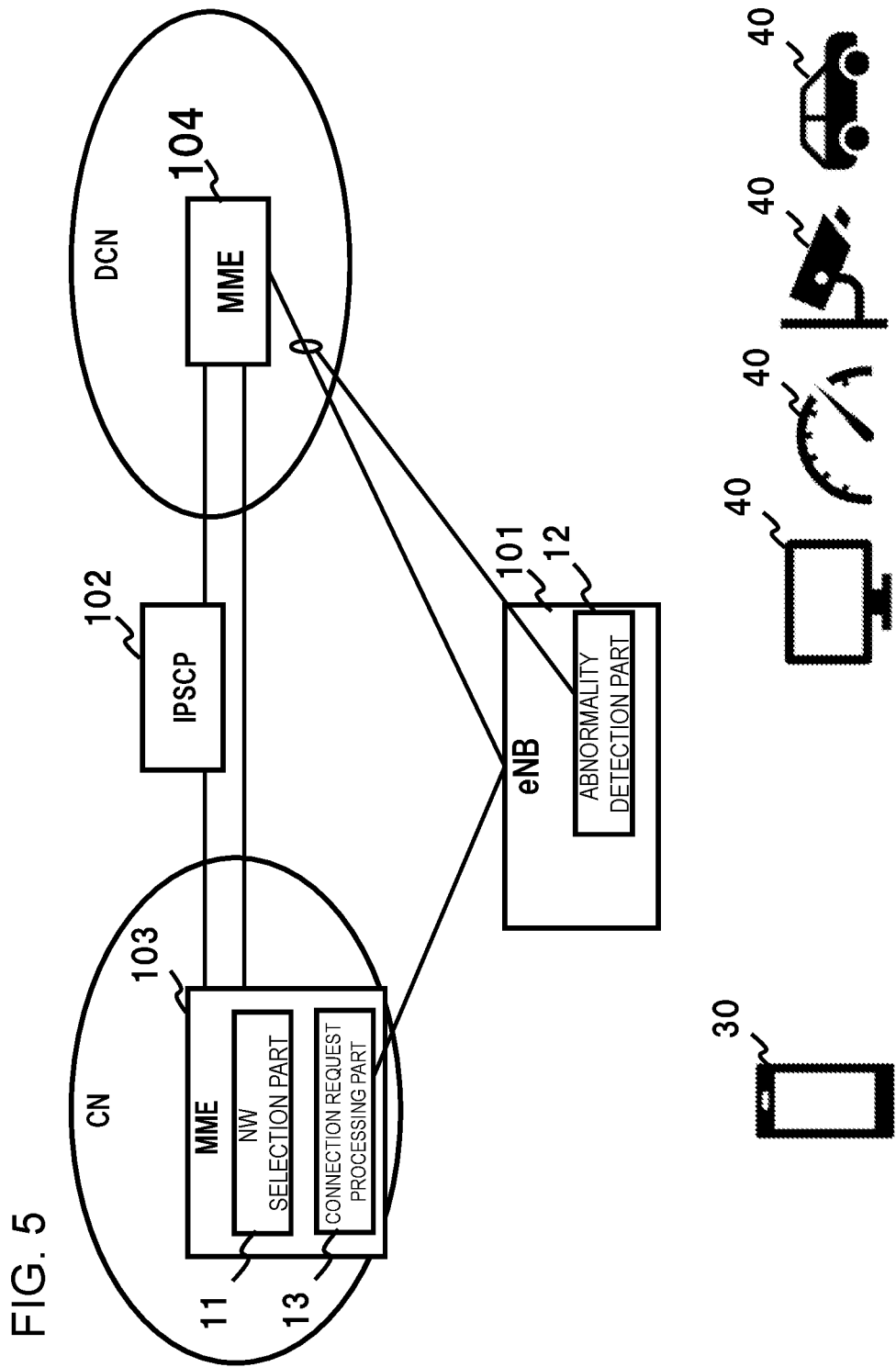
FIG. 5 illustrates a configuration according to a first exemplary embodiment of the present invention.

Next, a first exemplary embodiment of the present invention will be described in detail with reference to drawings. FIG. 5 illustrates a configuration according to the first exemplary embodiment of the present invention. With reference to FIG. 5, a DCN for terminals 40 is provided separately from a core network (CN) and an MME 103 and an MME 104 are provided respectively.

In addition, an eNB (eNodeB) 101, upon receiving a connection request from a terminal 30, 40, selects any one of the MMEs 103 and 104 and forwards the connection request. In the present exemplary embodiment, the eNB 101 is presumed to be set, upon receiving a new connection request, to forward the connection request to the MME 103.

In addition, in the present exemplary embodiment, the eNB 101 includes an abnormality detection part 12. This abnormality detection part 12 monitors communication between the eNB 101 and the MME 104 (S1-MME IF), detects that the DCN is in a state where the DCN cannot accommodate the terminals 40 due to a failure or the like, and measures the duration time of the failure or the like. In addition, this abnormality detection part 12 has a function of notifying of an MMEGI of the DCN in which the failure or the like has been detected and the duration time of the failure when notifying the MME 103 of a connection request from the terminal 40. This notification may employ a type to be included in a NAS (Non Access Stratum) signal exchanged by using a communication interface called S1-MME between the MME and the eNB.

In addition, the following description will be made assuming that the terminal 30 is a terminal operated by a person such as a smartphone or a mobile phone and that the terminals 40 are IoT terminals mounted on electronic appliances, meters, security devices, automobiles, and so on.

The MME 103,104 corresponds to the above network apparatus 103*a* and each has a function of checking with an IPSCP 102 whether the terminal 30, 40 that has transmitted a connection request is a terminal that is to be accommodated in the CN. In addition, the MME 103, 104 can determine an MME group ID (MMEGI) by referring to a DNS (Domain Name System) server or the like by using a UE Usage type or the like acquired as a result of the checking as a key. Alternatively, instead of referring to this DNS server or the like, it is possible to employ a configuration in which the MME 103, 104 may include a correspondence table of UE Usage types and MMEGIs.

In the present exemplary embodiment, the MME 103 includes an NW selection part 11 and a connection request processing part 13. Based on the above MMEGI acquired from the terminal type, the NW selection part 11 selects, between the CN and the DCN, the network to which the terminal that has transmitted the connection request is to be connected.

When the DCN is in a state of a failure or the like, the connection request processing part 13 transmits a connection rejection request in which a back-off timer value is set, to a network connection request from a terminal concerned. In addition, the connection request processing part 13 has a function of changing the back-off timer value based on the duration time of a failure or the like informed by the eNB 101, at that time. This function will be described in detail below.

The MME 104 may have the same configuration as that of the MME 103 or the MME 104 may have a configuration of the MME 103 without the connection request processing part 13.

Figure 6:
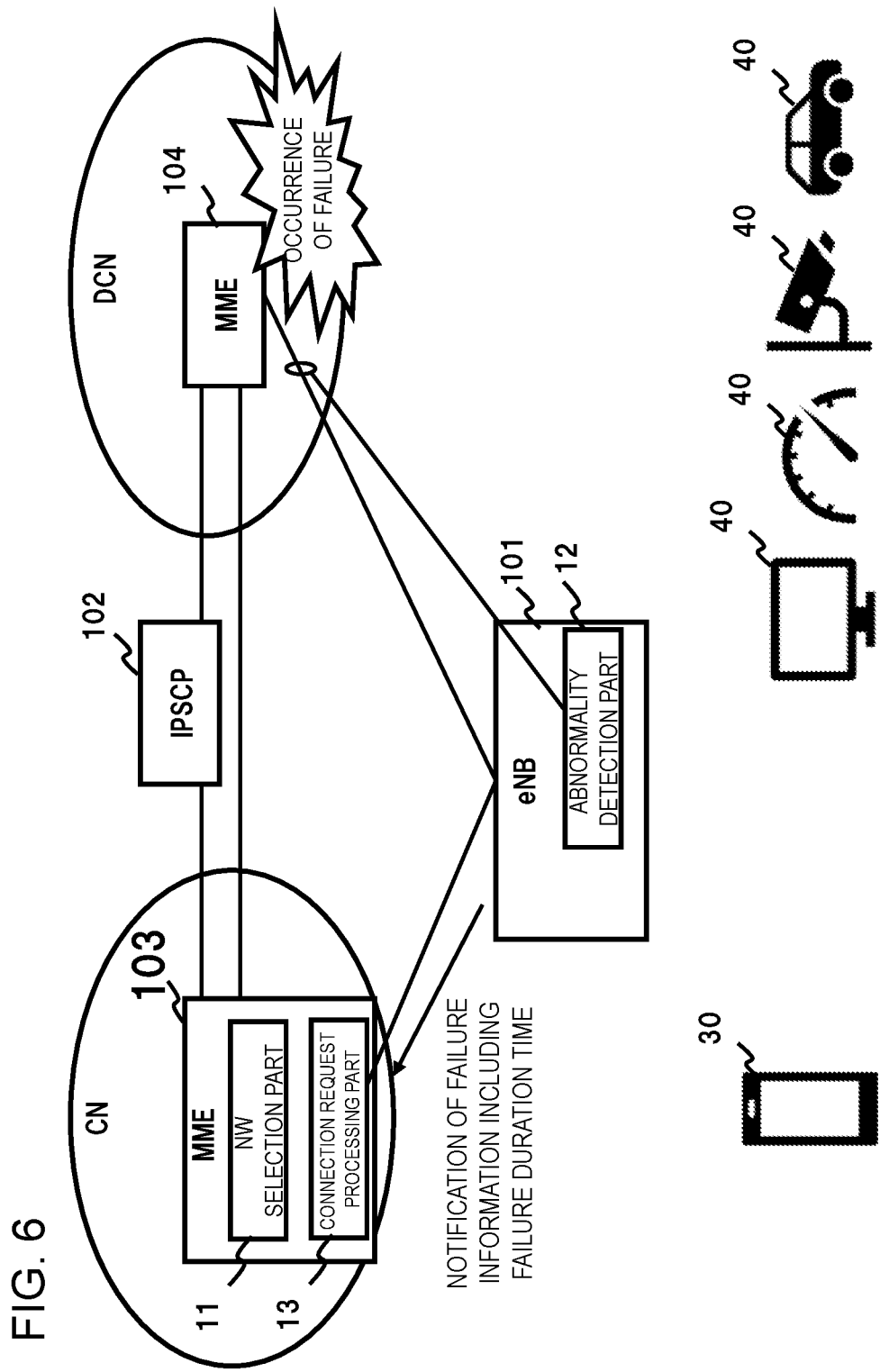
FIG. 6 illustrates an operation according to the first exemplary embodiment of the present invention.

Next, an operation of the present exemplary embodiment will be described in detail with reference to drawings. As described above, the abnormality detection part 12 of the eNB 101 monitors communication between the eNB 101 and the MME 104 and detects that the DCN is in a state where the DCN cannot accommodate the terminals 40 due to a failure or the like. The following description will be made assuming that, as illustrated in FIG. 6, a failure has occurred in the DCN and the abnormality detection part 12 has notified the MME 103 of the occurrence of the failure in the DCN and the duration time of the failure prior to forwarding a connection request from a terminal 40.

Figure 7:
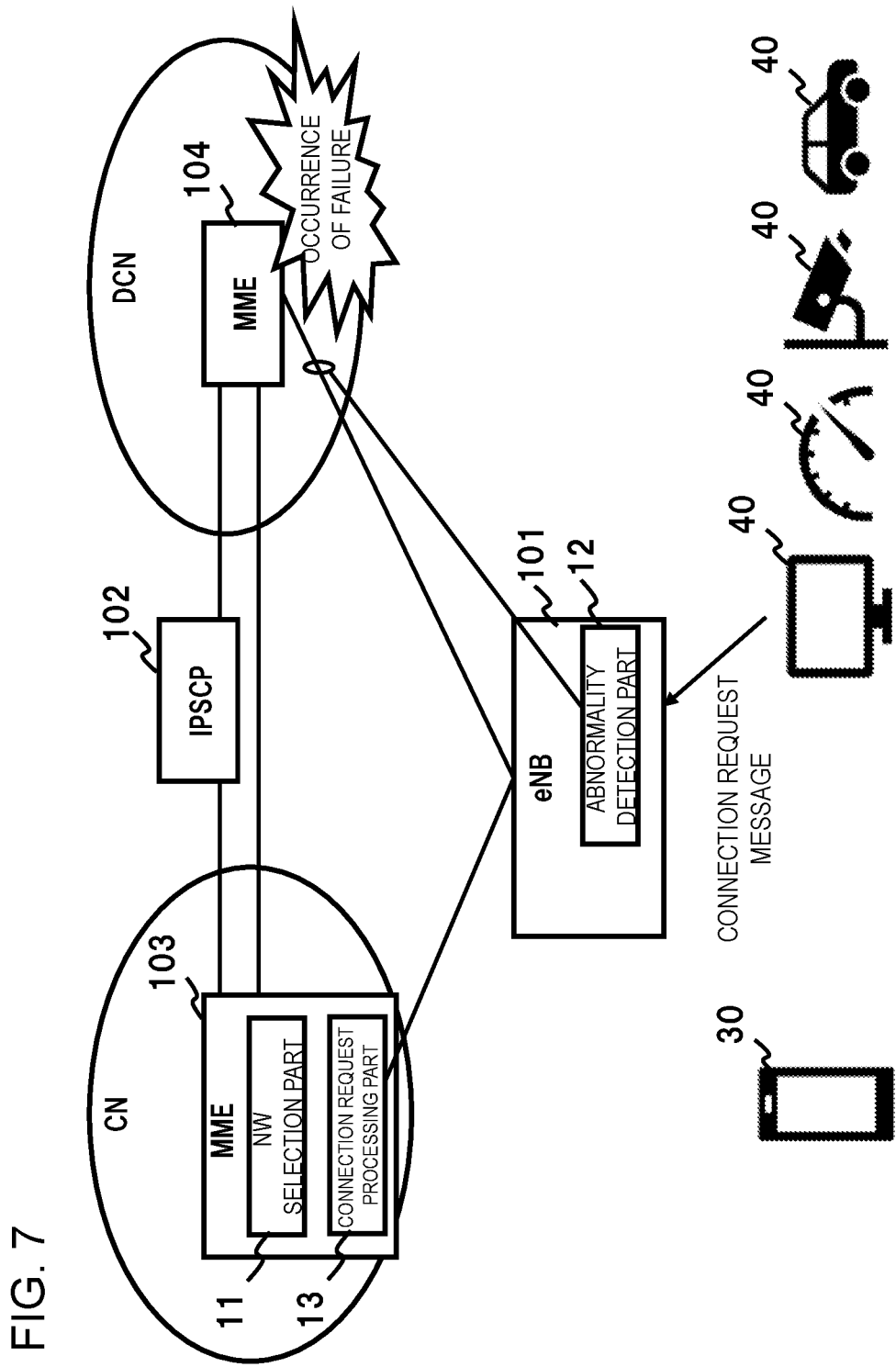
FIG. 7 illustrates an operation according to the first exemplary embodiment of the present invention.

As illustrated in FIG. 7, it is assumed that a terminal 40 transmitted a connection request message to the eNB 101, under a situation where a failure or the like has occurred in the DCN, as described above.

Figure 8:
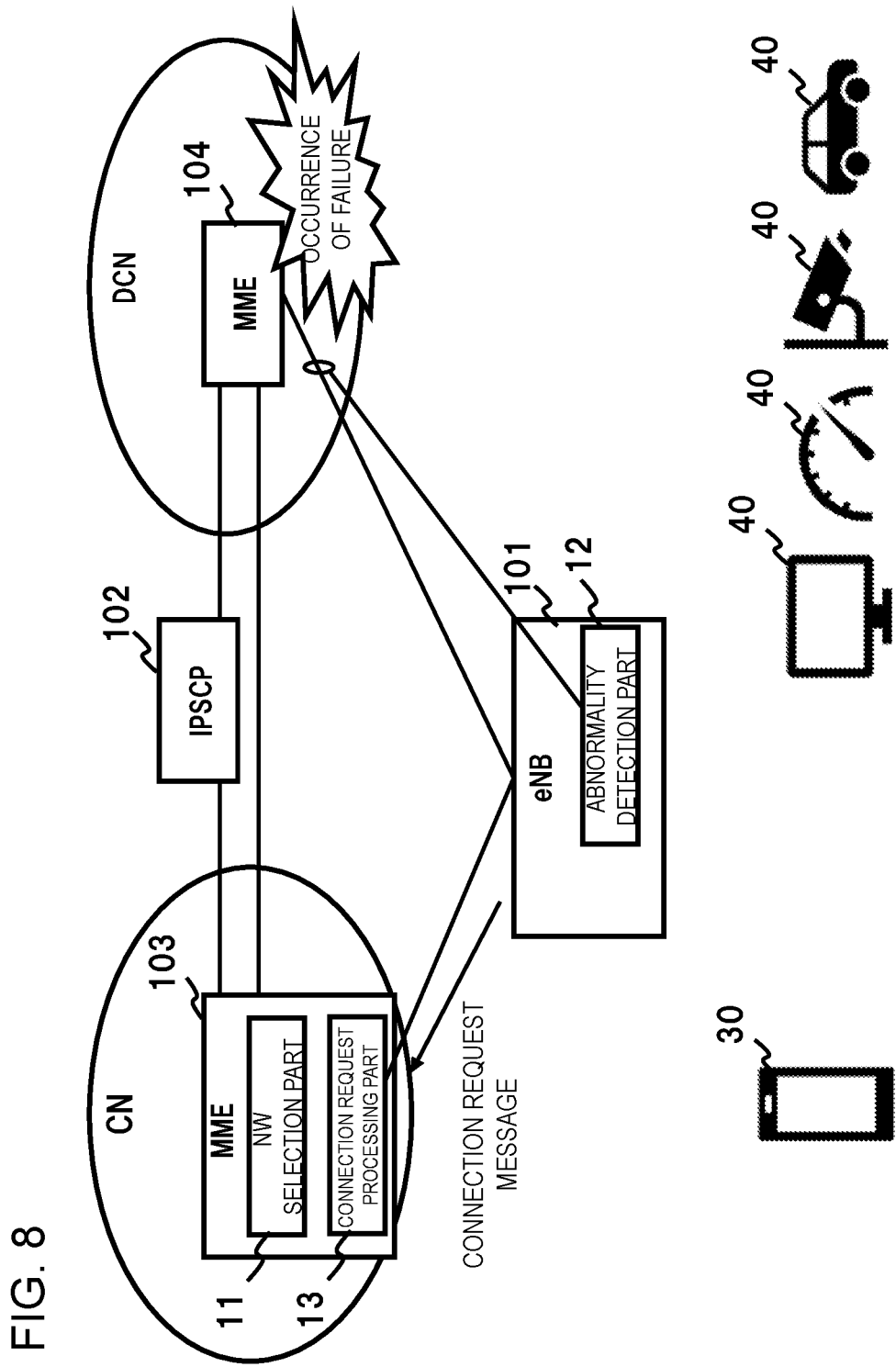
FIG. 8 illustrates an operation according to the first exemplary embodiment of the present invention.

The eNB 101 that received the connection request message forwards the connection request message from the terminal 40 to the MME 103, as illustrated in FIG. 8.

The MME 103 that received the connection request message from the terminal 40 refers to the IPSCP 102 about a UE Usage type by using terminal identification information about the terminal as a key. Next, the MME 103 determines an MMEGI corresponding to the UE Usage type by using a DNS or the like.

Figure 9:
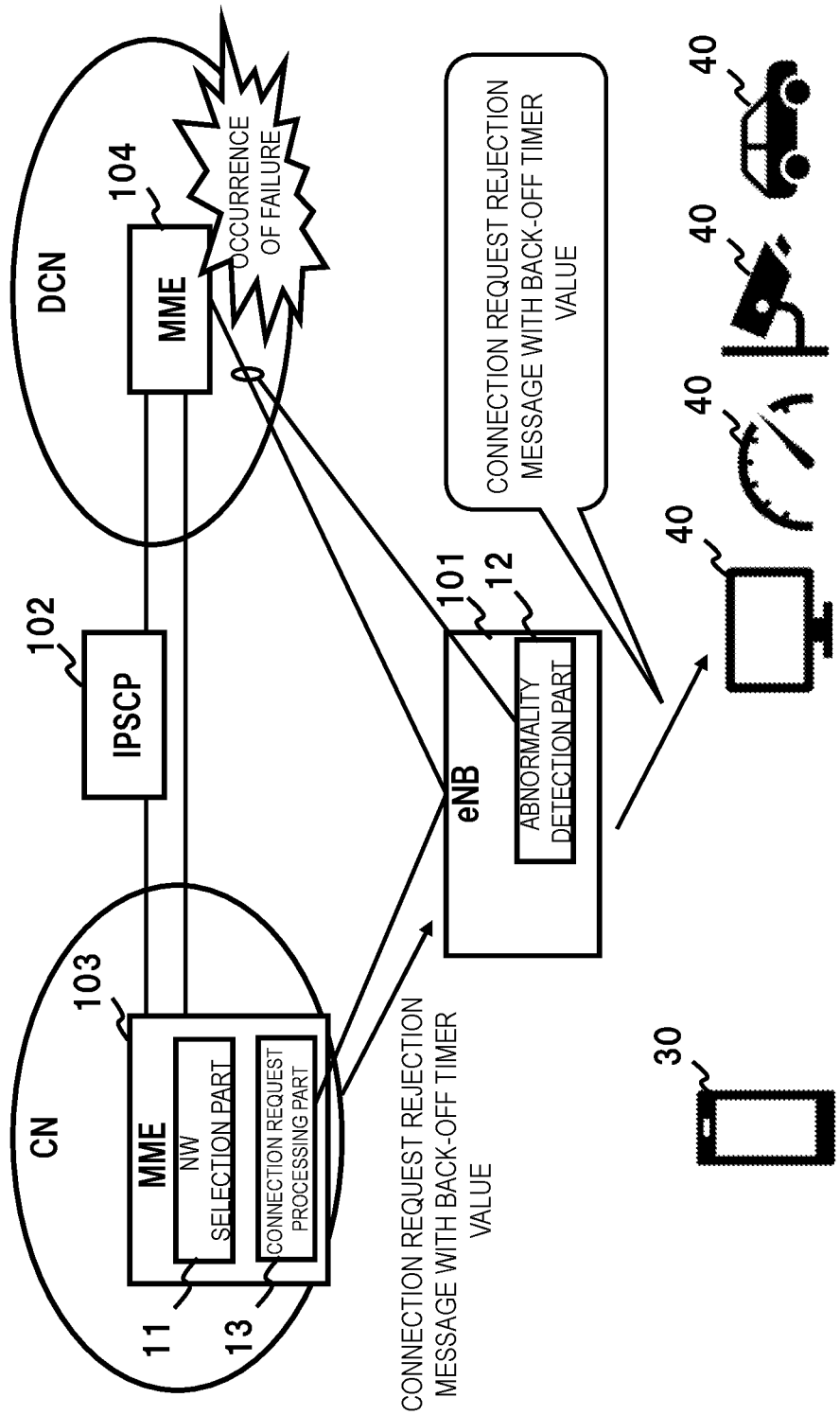
FIG. 9 illustrates an operation according to the first exemplary embodiment of the present invention.

Herein, since the terminal 40 is an IoT terminal, the MME 103 selects the DCN. In addition, the MME 103 checks whether the MMEGI corresponding to the selected DCN matches the MMEGI of the DCN for which it is notified that a failure has occurred in the DCN. In this case, as illustrated in FIG. 9, since a failure has occurred in the DCN, the MME 103 transmits a connection rejection message (Reject) to the terminal 40. In addition, at that time, the connection request processing part 13 sets a back-off timer value in the connection rejection message, based on the duration time of the failure or the like informed by the eNB 101.

The back-off timer value may be a fixed value but, for example, the back-off timer value may be changed in such a manner that the back-off timer value increases as the duration time of a failure or the like extends with reference to a table or the like illustrated in FIG. 10. For example, in case of FIG. 10, the MME 103 sets a larger back-off timer value if the duration time of a failure or the like in the DCN extends further. Namely, when the duration time of a failure or the like in the DCN is equal to or larger than a threshold value, a back-off timer value larger than that used when the duration time of a failure or the like is less than the threshold value is set.

In addition, the eNB 101 transmits to the terminal 40 the connection rejection message in which the back-off timer value is set (see FIG. 9).

The terminal 40 that received the connection rejection message in which the back-off timer value is set stops transmission of a connection request in accordance with the back-off timer value.

Consequently, reduction of the power consumption of the IoT terminals including the terminal 40 is achieved. In contrast, when it is the terminal 30 that transmits a connection request, since the MMEGI corresponding to the UE Usage type acquired from the IPSCP matches the MMEGI of the MME 103, the terminal 30 is accommodated in the CN and can receive services.

Thus, according to the present exemplary embodiment, optimization of targets of access control in case of a failure or the like in a DCN and reduction of the power consumption of the terminals 40 trying to access the DCN are achieved.

Second Exemplary Embodiment

Figure 11:
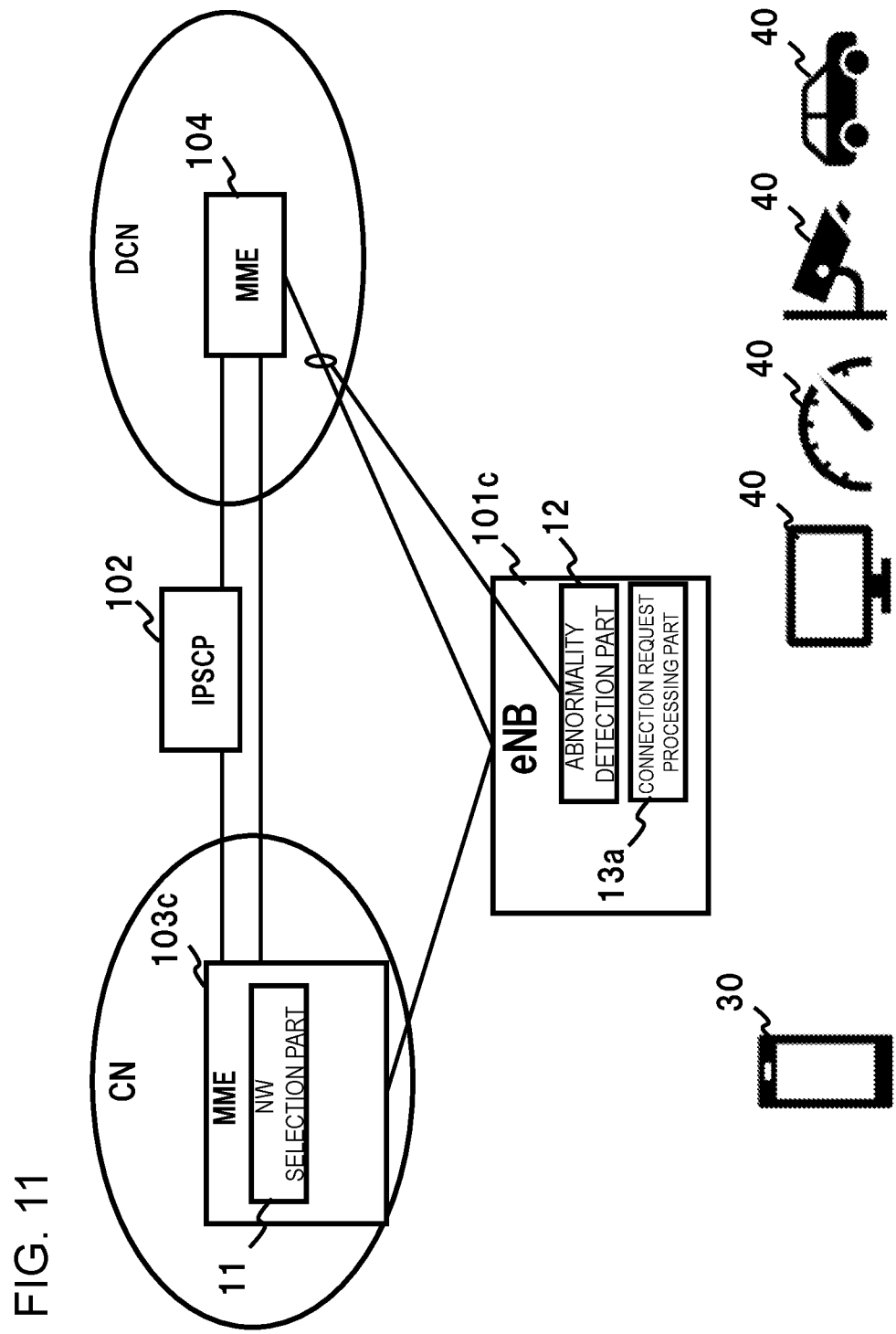
FIG. 11 illustrates a configuration according to a second exemplary embodiment of the present invention.

Next, a second exemplary embodiment in which a function corresponding to the connection request processing part 13 is arranged in a base station apparatus (eNB) side will be described. FIG. 11 illustrates a configuration according to the second exemplary embodiment of the present invention. With reference to FIG. 11, while a basic configuration is the same as that according to the first exemplary embodiment, there is a point in that a connection request processing part 13a is not arranged in an MME 103c side but arranged in an eNB 101c side. Since this makes operation differ, the following description will be made with a focus on the difference.

Figure 12:
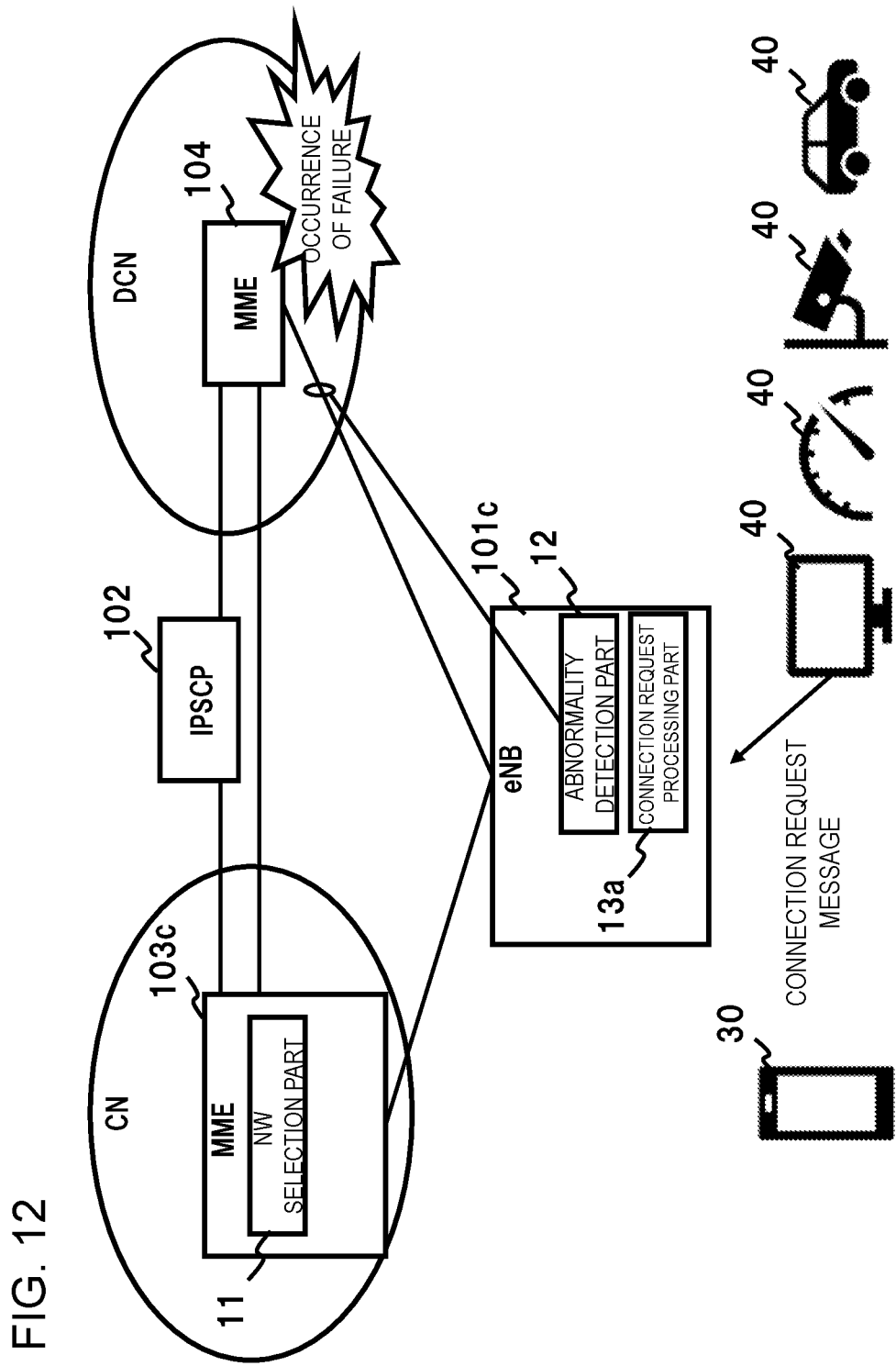
FIG. 12 illustrates an operation according to the second exemplary embodiment of the present invention.

As is the case with the first exemplary embodiment, an abnormality detection part 12 of the eNB 101c detects a failure or the like in a DCN. As illustrated in FIG. 12, it is assumed that a terminal 40 transmits a connection request message to the eNB 101c under a situation where a failure or the like has occurred in the DCN.

Figure 13:
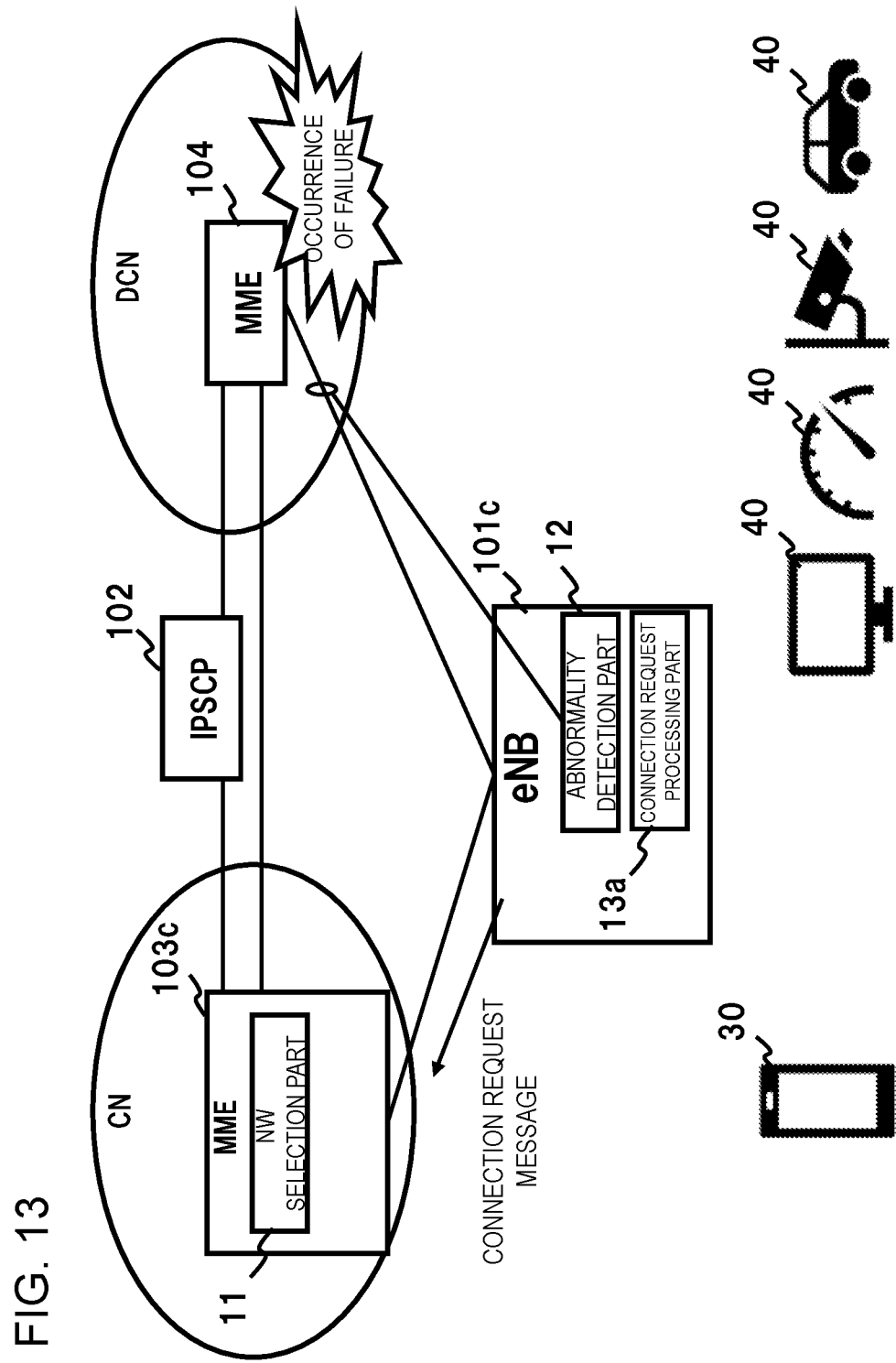
FIG. 13 illustrates an operation according to the second exemplary embodiment of the present invention.

The eNB 101c that received the connection request message forwards the connection request message from the terminal 40 to the MME 103c, as illustrated in FIG. 13.

The MME 103c that received the connection request message from the terminal 40 refers to an IPSCP 102 about a UE Usage type by using terminal identification information of the terminal as a key. Next, the MME 103c determines an MMEGI corresponding to the UE Usage type by using a DNS or the like.

Figure 14:
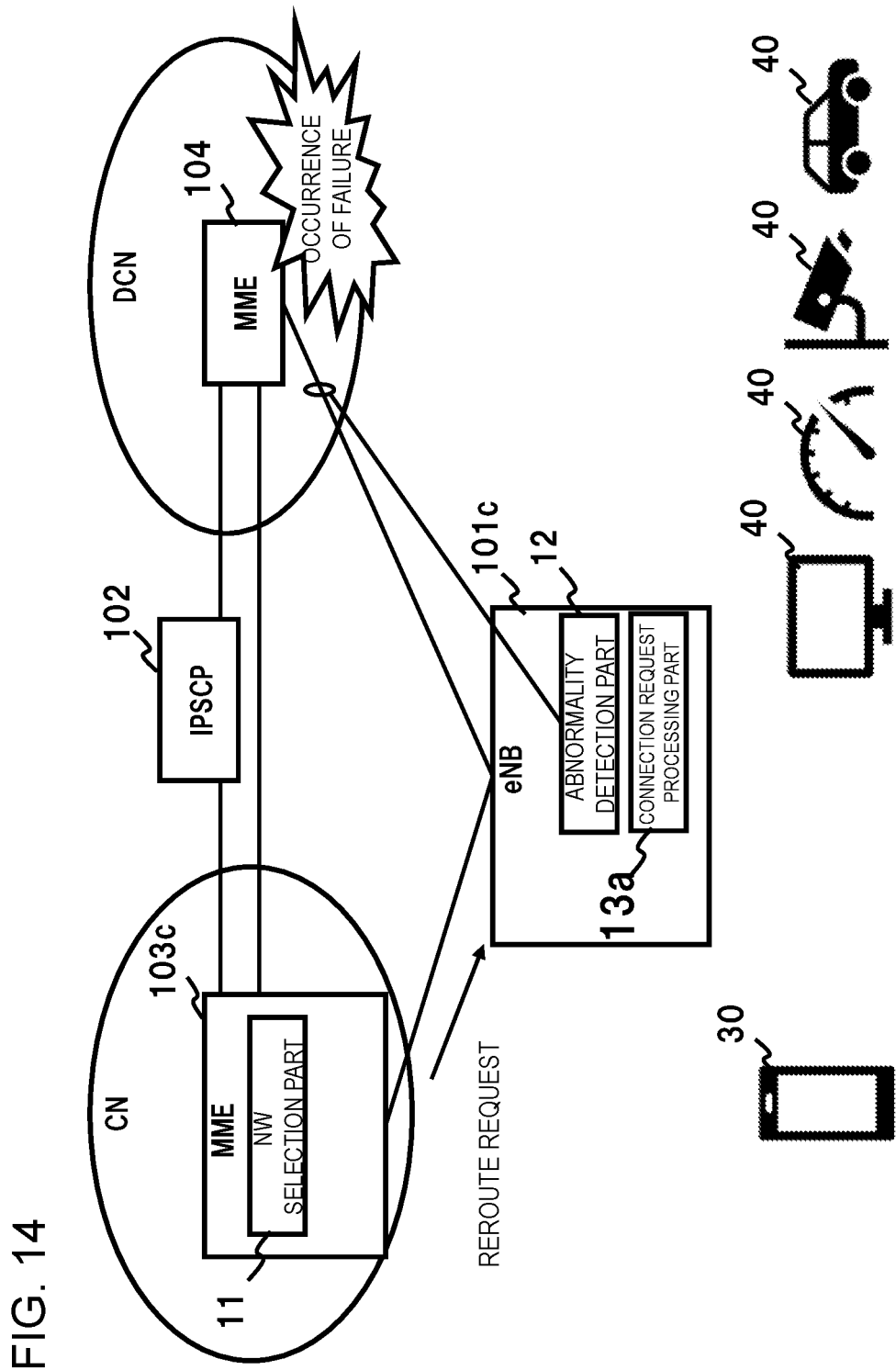
FIG. 14 illustrates an operation according to the second exemplary embodiment of the present invention.

Herein, since the terminal 40 is an IoT terminal, the MME 103c selects the DCN. Thus, as illustrated in FIG. 14, the MME 103c transmits a reroute request including the MMEGI to the eNB 101c.

Figure 15:
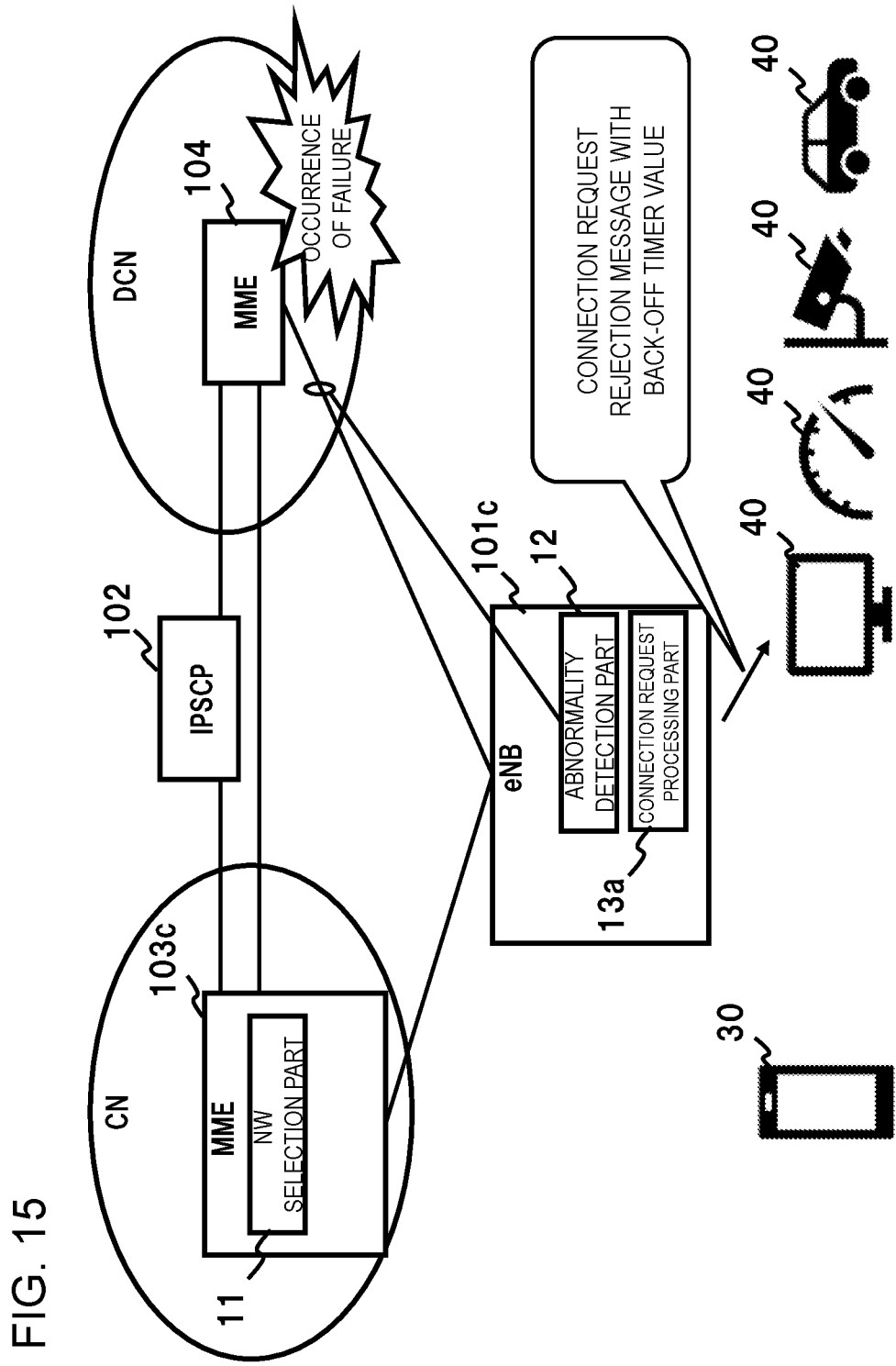
FIG. 15 illustrates an operation according to the second exemplary embodiment of the present invention.

The eNB 101c that received the reroute request checks whether the MMEGI specified in the reroute request matches the MMEGI of MME of the DCN for which it is detected that a failure has occurred. Herein, as illustrated in FIG. 15, since a failure has occurred in the DCN, the eNB 101c transmits a connection rejection message (Reject) to the terminal 40. The connection request processing part 13a sets a back-off timer value in the connection rejection message, based on the duration time of the failure or the like previously measured by the abnormality detection part 12.

The terminal 40 that received the connection reject message in which the back-off timer value is set stops transmission of a connection request in accordance with the back-off timer value.

Consequently, reduction of the power consumption of the IoT terminals including the terminal 40 is achieved. In contrast, when it is the terminal 30 that transmits a connection request, since the MMEGI corresponding to the UE Usage type acquired from the IPSCP matches the MMEGI of the MME 103c the terminal 30 is accommodated in the CN and can receive services.

As described above, the present invention can be realized by the configuration in which the function corresponding to the connection request processing part 13a is arranged in the base station apparatus (eNB) side and it is possible to achieve the same advantageous effects as those achieved by the first exemplary embodiment.

Of course, in the present exemplary embodiment, the back-off timer value may also be variable. For example, the eNB 101c may refer to the table or the like illustrated in FIG. 10 and change the back-off timer value in such a manner that the back-off timer value increases as the duration time of a failure or the like extends further.

While the above exemplary embodiments of the present invention have been described, the present invention is not limited thereto. Further modifications, substitutions, or adjustments can be made without departing from the basic technical concept of the present invention. For example, the configurations of the networks and the elements and the representation modes of the messages illustrated in the individual drawings are merely used as examples to facilitate the understanding of the present invention. Thus, the present invention is not limited to the configurations illustrated in the drawings. In addition, "A and/or B" in the following description signifies at least one of A or B.

For example, in the above exemplary embodiments, the back-off timer value may be changed by referring to the table illustrated in FIG. 10. However, alternatively, the back-off timer value may be calculated by multiplying the duration time of a failure or the like by a predetermined coefficient. In addition, there are cases in which two or more DCNs can be used depending on the terminal 40. Such terminal may be notified of only the occurrence of a failure in a DCN concerned.

Figure 16:
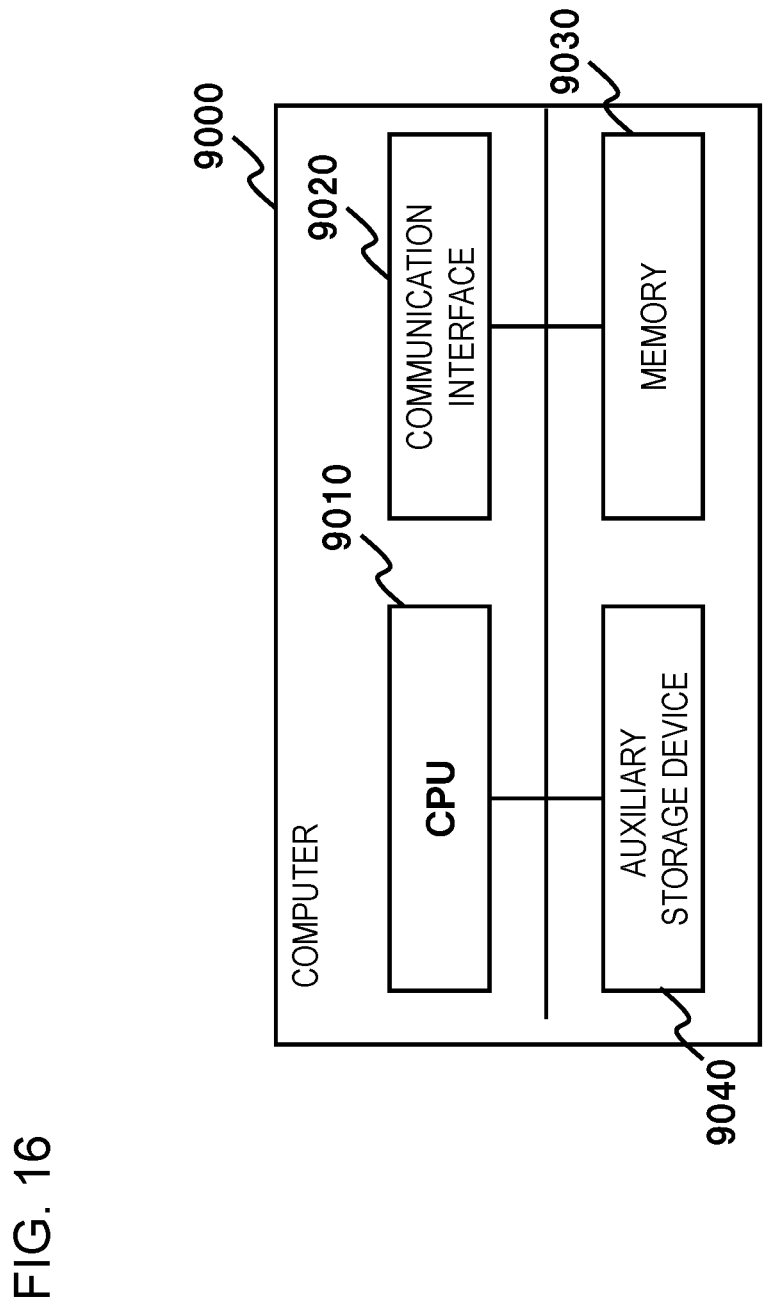
FIG. 16 illustrates a configuration of a computer that configures a relay apparatus according to the present invention.

The procedure according to an individual one of the first and second exemplary embodiments can be realized by a program that causes a computer (9000 in FIG. 16) functioning as a network apparatus or a base station apparatus to realize the function as these apparatus. Such computer is illustrated by a configuration, as an example, including a CPU (central processing unit) 9010, a communication interface 9020, a memory 9030, and an auxiliary storage device 9040 in FIG. 16. Namely, the CPU 9010 in FIG. 16 may be configured to execute a network selection program and a connection request processing program and to perform processing for updating various calculation parameters stored in the auxiliary storage device 9040 or the like.

Namely, an individual part (processing part, function) of the network apparatus and the base station apparatus according to the above first and second exemplary embodiments may be realized by a computer program that causes a processor mounted in the corresponding apparatus to perform the corresponding processing described above by using its hardware.

Finally, suitable modes of the present invention will be summarized.

[Mode 1]
(See the network apparatus according to the above first aspect)

[Mode 2]
The network apparatus may employ a configuration to receive whether or not the second network is in a state where the second network cannot accommodate the terminal(s) that belongs to the predetermined terminal type from a predetermined base station.

[Mode 3]
The connection request processing part of the network apparatus may employ a configuration to change the back-off timer value based on the time period during which the second network is in a state where the second network cannot accommodate the terminal(s) that belongs to the predetermined terminal type.

[Mode 4]
The connection request processing part of the network apparatus may employ a configuration to set a second back-off timer value larger than a first back-off timer value, when the time period during which the second network is in a state where the second network cannot accommodate the terminal(s) that belongs to the predetermined terminal type is longer than a predetermined threshold value.

[Mode 5]
The network selection part of the network apparatus may employ a configuration to select a network to which the terminal is to be connected, based on a mobility management entity MME group identifier acquired from a predetermined domain name system DNS server by using a UE usage type information about the terminal.

[Mode 6]
(See the base station apparatus according to the above second aspect)

[Mode 7]
(See the communication control method according to the above third aspect)

[Mode 8]
According to the fourth aspect, there is provided a communication control method, comprising:
by a base station apparatus connected to a network apparatus which comprises a network selection part that selects, between a first network and a second network that accommodates a terminal(s) that belongs to a predetermined terminal type, a network to which a terminal is to be connected, based on the terminal type,
a step of receiving a result of selection of the network to which the terminal is to be connected from the network apparatus; and
a step of transmitting, when the second network is selected by the network apparatus and when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned.

[Mode 9]
(See the program according to the above fifth aspect)
The above modes 6 to 9 can be expanded in the same way as mode 1 is expanded to modes 2 to 5.

The disclosure of each of the above PTLs and NPL is incorporated herein by reference thereto. Variations and adjustments of the exemplary embodiments and examples are possible within the scope of the overall disclosure (including the claims) of the present invention and based on the basic technical concept of the present invention. Various combinations and selections of various disclosed elements (including the elements in each of the claims, exemplary embodiments, examples, drawings, etc.) are possible within the scope of the disclosure of the present invention. Namely, the present invention of course includes various variations and modifications that could be made by those skilled in the art according to the overall disclosure including the claims and the technical concept. In particular, with respect to the numerical ranges described herein, any numerical values or small range(s) included in the ranges should be construed as being expressly described even if not otherwise specified.

REFERENCE SIGNS LIST 11 network selection part (NW selection part)
12 abnormality detection part
13, 13a connection request processing part
30, 40 terminal
101, 101c eNB
101a, 101b base station apparatus
102 IPSCP
103, 103c, 104 MME
103a, 103b network apparatus
9000 computer
9010 CPU
9020 communication interface
9030 memory
9040 auxiliary storage device

What is claimed is:

1. A network apparatus, comprising:
at least a processor; and
a memory in circuit communication with the processor,
wherein the processor is configured to execute program instructions stored in the memory to implement:
a network selection part which selects, between a first network and a second network that accommodates a terminal(s) that belongs to a predetermined terminal type, a network to which a terminal is to be connected, based on the terminal type; and
a connection request processing part which transmits, when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned.

2. The network apparatus according to claim 1; wherein the processor is configured to execute the program instructions stored in the memory to implement:
that the network apparatus receives whether or not the second network is in a state where the second network cannot accommodate the terminal(s) that belongs to the predetermined terminal type from a predetermined base station.

3. The network apparatus according to claim 1; wherein the processor is configured to execute the program instructions stored in the memory to implement:
that the connection request processing part changes the back-off timer value based on the time period during which the second network is in a state where the second network cannot accommodate the terminal(s) that belongs to the predetermined terminal type.

4. The network apparatus according to claim 1; wherein the processor is configured to execute the program instructions stored in the memory to implement:
that the connection request processing part sets a second back-off timer value larger than a first back-off timer value, when the time period during which the second network is in a state where the second network cannot accommodate the terminal(s) that belongs to the predetermined terminal type is longer than a predetermined threshold value.

5. The network apparatus according claim 1; wherein the processor is configured to execute the program instructions stored in the memory to implement:
that the network selection part selects a network to which the terminal is to be connected, based on a mobility management entity (MME) group identifier acquired from a predetermined domain name system (DNS) server by using a user equipment (UE) usage type information about the terminal.

6. A base station apparatus, wherein the base station apparatus is connected to a network apparatus comprising a network selection part which selects, between a first network and a second network that accommodates a terminal(s) that belongs to a predetermined terminal type, a network to which a terminal is to be connected, based on the terminal type, and wherein
the base station apparatus comprises:
at least a processor; and
a memory in circuit communication with the processor,
wherein the processor is configured to execute program instructions stored in the memory to implement:
an abnormality detection part which detects that the second network is in a state where the second network cannot accommodate the terminal(s) that belongs to the predetermined terminal type; and
a connection request processing part which transmits, when the second network is selected by the network apparatus and when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned.

7. The base station apparatus according to claim 6; wherein the processor is configured to execute the program instructions stored in the memory to implement:
that the connection request processing part changes the back-off timer value based on a time period during which the second network is in a state where the second network cannot accommodate the terminal(s) that belongs to the predetermined terminal type.

8. The base station apparatus according to claim 6; wherein the processor is configured to execute the program instructions stored in the memory to implement:
that the connection request processing part sets a second back-off timer value larger than a first back-off timer value when the time period during which the second network is in a state where the second network cannot accommodate the terminal(s) that belongs to the predetermined terminal type is longer than a predetermined threshold value.

9. A communication control method, comprising steps of: comprising:
selecting, between a first network and a second network that accommodates a terminal(s) that belongs to a predetermined terminal type, a network to which a terminal is to be connected, based on the terminal type; and
transmitting, when the second network is in a state where the second network cannot accommodate the terminal(s) that belongs to the predetermined terminal type, a connection rejection request in which a back-off timer value indicating a time period during which transmission of a next network connection request is inhibited, is set, to a network connection request from a terminal concerned.

10. The communication control method according to claim 9; further comprising receiving whether or not the second network is in a state where the second network cannot accommodate the terminal(s) that belongs to the predetermined terminal type from a predetermined base station.

11. The communication control method according to claim 9; wherein the transmitting comprises changing the back-off timer value based on the time period during which the second network is in a state where the second network cannot accommodate the terminal(s) that belongs to the predetermined terminal type.

12. The communication control method according to claim 9; wherein the transmitting comprises setting a second back-off timer value larger than a first back-off timer value, when the time period during which the second network is in a state where the second network cannot accommodate the terminal(s) that belongs to the predetermined terminal type is longer than a predetermined threshold value.

13. The communication control method according to claim 9; wherein the selecting comprises selecting a network to which the terminal is to be connected, based on a mobility management entity (MME) group identifier acquired from a predetermined domain name system(DNS) server by using a user equipment (UE) usage type information about the terminal.

* * * * *